United States Patent [19]

Davis

[11] Patent Number: 5,423,554
[45] Date of Patent: Jun. 13, 1995

[54] VIRTUAL REALITY GAME METHOD AND APPARATUS

[75] Inventor: Geoffrey M. Davis, Wilson, N.C.

[73] Assignee: MetaMedia Ventures, Inc., New York, N.Y.

[21] Appl. No.: 126,384

[22] Filed: Sep. 24, 1993

[51] Int. Cl.⁶ ............................................. A63F 9/22
[52] U.S. Cl. ................................... 273/437; 273/434;
273/85 G; 345/4; 345/114; 345/153; 364/516;
348/25; 348/172
[58] Field of Search ............... 273/433, 434, 435, 436,
273/437, 438, 439, 85 G, 460, DIG. 28;
434/323, 335; 364/410, 516, 526; 395/100, 118,
152; 358/105; 345/1, 4, 6, 7, 8, 10, 11, 22, 113,
114, 115, 122, 153

[56] References Cited

U.S. PATENT DOCUMENTS

| Re. 33,662 | 8/1991 | Blair et al. ............................. 364/410 |
| D. 338,050 | 8/1993 | Holmes ................................. 201/240 |
| D. 338,051 | 8/1993 | Holmes ................................. D21/240 |
| 4,488,245 | 12/1984 | Dalke et al. ........................... 364/526 |
| 4,590,469 | 5/1986 | Seals ................................... 340/347 |
| 4,678,338 | 7/1987 | Kitta et al. ........................... 356/402 |
| 4,797,738 | 1/1989 | Kashi et al. ........................... 358/101 |
| 4,917,500 | 4/1990 | Lugos ................................. 356/406 |
| 4,954,972 | 9/1990 | Sullivan ............................... 364/526 |
| 4,958,224 | 9/1990 | Lepore et al. ......................... 358/126 |
| 4,984,179 | 1/1991 | Waldern ............................... 364/514 |
| 5,012,431 | 4/1991 | Stanziola ............................. 364/526 |
| 5,027,195 | 6/1991 | Cooley et al. ......................... 358/75 |
| 5,117,101 | 5/1992 | Moore et al. ......................... 250/226 |
| 5,130,794 | 7/1992 | Ritchey .............................. 358/87 |
| 5,136,519 | 8/1992 | Yonemitsu ........................... 364/470 |
| 5,142,506 | 8/1992 | Edwards .............................. 367/127 |
| 5,148,154 | 9/1992 | MacKay et al. ...................... 340/712 |
| 5,148,310 | 9/1992 | Batchko ............................. 359/479 |
| 5,165,897 | 11/1992 | Johnson .............................. 434/113 |
| 5,174,759 | 12/1992 | Preston ............................... 434/335 |
| 5,175,694 | 12/1992 | Amato ............................... 364/516 |
| 5,177,872 | 1/1993 | Lewis et al. .......................... 33/366 |
| 5,184,319 | 2/1993 | Kramer .............................. 364/806 |
| 5,185,561 | 2/1993 | Good et al. .......................... 318/342 |
| 5,187,540 | 2/1993 | Morrison ............................ 356/152 |
| 5,193,000 | 3/1993 | Lipton et al. ......................... 358/92 |
| 5,214,615 | 5/1993 | Bauer ................................ 367/128 |
| 5,227,985 | 7/1993 | DeMenthon ......................... 364/559 |
| 5,229,756 | 7/1993 | Kosugi et al. ........................ 273/438 |
| 5,288,078 | 2/1994 | Copper et al. ........................ 273/438 |
| 5,319,387 | 6/1994 | Yoshikawa .......................... 273/438 |

OTHER PUBLICATIONS

Krueger, Myron W., *Artificial Reality*, Addison-Wesley, 1983 pp. 55-75.

May 1992 Ed. *Presentation Development and Delivery*, "Interacting in a Virtual World", pp. 14-15.

*Primary Examiner*—Jessica J. Harrison
*Attorney, Agent, or Firm*—Richard C. Woodbridge

[57] ABSTRACT

A one or two player virtual reality game efficiently detects and tracks a distinctively colored glove. According to the preferred basketball embodiment, a single player equipped with the distinctively colored glove is matched up against a virtual opponent. The object of the game is for the real player to put a virtual basketball into a virtual basketball hoop before his/her virtual opponent steals the ball. Initially, the background site is scanned, and then the operator with the glove is scanned. A table of colors is then established which are unique only to the glove. A player is then scanned against the background to identify which color glove will have the least conflict with colors worn by the player. During play, the player is scanned at 30 frames a second and the information is stored in a frame buffer. A prediction is made of the location of the glove in subsequent frames based upon its previously known location and velocity. Therefore, a search for the glove can be made of only a limited portion of the full frame, thereby increasing the speed of acquisition. Gestures made by the player such as a flick shot, a dribble or a roundhouse shot can be distinguished so as to automatically cause the basketball to be released from the player's hand. If the velocity and direction of the ball are substantially in the direction of the virtual basketball hoop, then the player will be credited with a score.

15 Claims, 16 Drawing Sheets

COMBINED TABLES BEFORE REMOVAL OF AMBIGUOUS COLORS

[Grid with X, ⊗, and O markers] — 986, 988, 990

| X | GLOVE COLORS |
| O | NON-GLOVE COLORS |

980

GLOVE COLOR TABLE AFTER REMOVAL OF AMBIGUOUS COLORS

[Grid with X markers on left side] — 992

994 — | X | GLOVE COLORS
996 — | ☐ | NOT CLASSIFIED OR NON-GLOVE COLORS

NON-GLOVE COLOR TABLE AFTER REMOVAL OF AMBIGUOUS COLORS

[Grid with O markers on right side] — 1000

998 — | O | NON-GLOVE COLORS
1002 — | ☐ | NOT CLASSIFIED OR GLOVE COLORS

*FIG. 13E*

VIRTUAL REALITY GAME METHOD AND APPARATUS

BACKGROUND OF THE INVENTION

1. Field of the Invention

In general, the invention relates to a virtual reality game method and apparatus and, in particular, to a virtual reality game in which a player wears a distinctively colored glove which is efficiently identified and tracked during the course of the game.

2. Description of Related Art

The term "virtual reality" has come to mean the superposition of a first image, typically a "real image" against or in a second image, typically a background, to create the illusion that the first image is, in fact, located in the second image. There are two types of virtual reality, namely first person and third person. First person involves the participant directly whereas third person allows the participant to see him or himself on a display in a specific environment. The present invention relates to a third person virtual reality technology. Aspects of virtual reality have been known for some time. For example, "Heads Up" displays are known in the context of aviation wherein a target, for example, might be superimposed upon the clear canopy of an airplane. Also, certain aspects of virtual reality have been developed in the remote control art. It is known, for example, how to remotely grip a handle and manipulate a remote object at some distance. Such systems have found early use in the nuclear testing and electrical generating field where the handling of radioactive isotopes is required.

Virtual reality is mentioned or discussed in at least the following U.S. Pat. Nos.: D338,051; D338,050; 5,227,985; 5,214,615; 5,193,000; 5,187,540; 5,185,561; 5,184,319; 5,177,872; 5,165,897; 5,148,310; 5,148,154; 5,142,506 and 5,130,794.

Perhaps the most relevant of the foregoing group is U.S. Pat. No. 5,227,985 which discusses the use of a camera for the purpose of determining the orientation of an object. Also possibly relevant is U.S. Pat. No. 5,214,615 which discloses a tracking technique based upon responses from a microphone.

A body of technology also exists for the purpose of detecting and distinguishing between colors. For example, see U.S. Pat. No. 4,488,245 entitled METHOD AND MEANS FOR COLOR DETECTION AND MODIFICATION. That patent describes a method and means for color detection and modification wherein the recognition of color is based upon the definition of a three-dimensional color sub-space within a three-dimensional color universe. Initially, an object is scanned and its chromaticity values are digitized and modeled as a function of chrominance and luminance. Three 8-bit words are stored for each pixel of the digitized color picture. The first value is an approximation of luminance, while the second and third values represent variations of chromaticity or chrominance. The technique described can be used in robotic devices or in three-dimensional physical space and specifically may be employed with computer-generated animation.

U.S. Pat. Nos. 5,012,431 and 5,136,519 describe color scanning techniques which employ a computer to identify whether a particular color is present in a textile or other context.

The following patents are cited as showing the general state of the art of color recognition and detection technology, but are not offered as an exhaustive compilation: 4,590,469; 4,678,338; 4,797,738; 4,917,500; 4,954,972; 5,027,195 and 5,117,101.

Tracking objects using a computer can be found in a number of contexts, the most common of which is in the area of tracking missiles or airplanes with radar. Some U.S. Patents discuss tracking in other contexts. See, for example, U.S. Pat. No. 5,173,865 which includes a three-dimensional motion parameter estimator. The system described in U.S. Pat. No. 5,231,483 tracks a human being and produces an error signal based upon the individual's motion. That helps a camera motor anticipate the future position of the object being tracked. See also, U.S. Pat. No. 5,227,985, previously discussed, FIG. 9.

Centroid determination in a context of tracking systems appears to be discussed in at least the following U.S. Pat. Nos.: 4,958,224 and 5,175,694.

Lastly, U.S. Pat. No. 4,984,179 discloses a helmet used in the context of a virtual model but otherwise does not appear to be as relevant as some of the other references discussed above.

Finally, the May 1992 issue of "Presentation Development and Delivery" includes an article entitled "Interacting in a Virtual World" on pages 14–15 which describes a virtual reality promotion in which a user, wearing a color glove, has his or her image superimposed upon a background. The background bombards the user with a barrage of incoming objects simulating drug activity in three locations of the body. The object of the game is for the user to block the incoming object with his or her hand, thereby deflecting it from the body. A computer tracks the number of successful blocks and displays a final score based upon the success of the user. While the system just described has some features in common with regard to the present invention, nevertheless, is a much more primitive and limited version and is incapable of performing relatively sophisticated and realistic interactive actions.

It was in the context of the foregoing prior art that the present invention arose.

SUMMARY OF THE INVENTION

Briefly described, the invention comprises a virtual reality game apparatus and method which employs a glove whose distinctive color is identified, tracked and predicted so that it can be employed as part of a sophisticated interactive game. The preferred embodiment of the invention is known as "Jump Shot! " or "Virtual Hoops" and requires a player, wearing a special glove, to compete against a virtual opponent in a simulated one-on-one basketball game. Prior to all game playing, the system is taught to recognize each of several uniformly colored cotton gloves which will be used for tracking during game play. The result of the training is a set of master color tables in a three-dimensional color scheme which classify all possible color values as glove color or non-glove color. Colors in these tables are referenced with three 6-bit values, the chroma x, chroma y, and luma value. The system establishes these tables by the following procedure: First, the system scans a background site to determine the colors present therein. All background colors are classified as non-glove colors. The system then scans the background site with the operator present. All colors present in this image are also classified as non-glove colors. The system then repeats the following process for each glove color it learns to recognize: first the operator puts on a glove of the color to be learned. The operator is prompted to place his or her gloved hand in five to ten different boxes on the video screen so that the system can scan the image of the glove in various different positions and flexures. All pixels scanned within the boxes are classified as possible glove colors and their frequencies of occurrence are tabulated. The system pares down the table of possible glove colors to a table of actual glove colors by removing from the possible glove color table all colors which have previously been classed as non-glove colors.

At the beginning of each game the player is scanned standing against the background. All colors found in this image are classified as non-glove colors. The player's clothing and skin colors are compared with the tables of known glove colors established above. A color of glove is chosen which maximizes the frequency of the glove colors in the table which do not conflict with colors found in the image of the player. The player then puts on a glove of the color selected. The system customizes its table of known glove colors to the current player by performing a brief training session. The player is prompted to touch four or five objects on screen, and the player is scanned each time he or she touches one of the objects. As above, all pixels scanned near the objects are classified as possible glove colors. Also, all colors which were previously classified as glove colors for the selected color are added to the table of possible glove colors. The system pares down the table of possible glove colors to a table of actual glove colors by removing from the possible glove color table all colors which have previously been classed as non-glove colors.

The play of the game is typically made against a 60-second shot clock. The player initially touches one of the basketballs and makes a dribbling motion. The virtual opponent then comes out to try to block the player. If the virtual opponent touches the basketball, then the virtual opponent scores a steal and slam dunks the ball through the basket, thereby giving the virtual opponent a score. The real player, whose image is superimposed on a display with the virtual player, can shoot the basket by making one of three distinctive gestures including a flick shot, a dribble shot and an overhand throw. The system can recognize these motions as three distinct gestures and interpret them as instructions for the simulated basketball to leave the hand of the player. If the direction and velocity of the hand is substantially in the direction of the virtual basketball hoop, i.e. the goal, then the ball will appear to go through the basket and the player will get two points. If the real player makes more points then the virtual opponent during the 60 seconds of play, then the real player wins.

The system requires the position of the player's gloved hand throughout the game. Glove position is determined by locating collections of glove-colored pixels in the scanned image of the player. The system digitizes the video image of the player 30 times per second and stores the digitized video fields in a frame buffer. Each field is approximately 640×240 pixels. This is a large amount of date to search for the glove, and since the game requires glove position data in real time, the time required to locate the glove must be small. Accordingly, the system includes a method for predicting the future location of the glove based on the glove's last known location and velocity. The system will therefore normally search a limited, smaller portion of the full frame buffer for the glove. The limited search is performed in a coarse-to-fine manner starting at the predicted position of the glove and radiating outward. Initially, every fourth line of the frame buffer is search, then every other line. If this limited search fails, a coarse full-buffer search is performed in which every sixteenth line is searched. Failing the full buffer search, the current field is discarded and another acquired. For the next digitized field, a search is performed in an area larger than that before, but still smaller than the full size of the frame buffer. This search begins at the last known position of the glove. This search is again coarse-to-fine, searching first every eighth line, then every fourth. If this limited search fails, a coarse search of the full frame buffer is performed. If the full buffer search fails a second time, the second field is discarded and a third acquired. The full buffer is searched in a coarse-to-fine manner starting at the center of the screen and radiating outwards. First every sixteenth line is searched, then every eighth, and then every fourth. New fields are acquired and the full-buffer is searched in this manner until the glove is found.

Throughout the search process, pixels from the frame buffer are compared to the table of known glove colors for the selected glove. Each pixel in the frame buffer has its chroma and luma values spread out over 8 bytes in the frame buffer. Examining all 8 bytes is a computationally expensive process. Since enough information is contained in the first 2 bytes of these 8 bytes to rule out most pixels from being glove colors, a second, abbreviated table of glove colors is established which allows the system to classify most pixels as non-glove color by examining only the first 2 of 8 bytes. Pixels which cannot be classified by the initial table then have all 8 bytes checked.

When the glove is located, its centroid is determined in order to assign consistently to the glove a single (x,y) value. This value is transmitted from the computer which performs the tracking to the computer which runs the game via a serial line.

Other useful features of the present invention include the ability to automatically determine the height of the player and scale the height of the virtual opponent in proportion to the size of the player. The width and the outline of the player are also acquirable and can be used for purposes of determining when the player bumps into objects or the side frame of the background.

The basic concepts can be employed for other types of games. For example, it is possible to play a two player game in which two real players each wear gloves of different distinctive colors and compete with each other on a one-on-one basis to put the basketball into a virtual hoop. Another embodiment permits the player to use his or her hand to move the player's whole body. For example, the player could be superimposed upon a moonscape and the movement of the gloved hand would cause the entire image of the player to jump up and down as if in an environment of substantially reduced gravity.

These and other features of the invention may be more fully understood by reference to the following drawings.

BRIEF DESCRIPTION OF THE DRAWINGS

FIG. 13E illustrates the process of removing ambiguous color values from the region grown tables of glove color values and non-glove color values.

DETAILED DESCRIPTION OF THE PREFERRED EMBODIMENT

During the course of this description, like numbers are used to identify like elements according to the different figures that illustrate the invention.

Figure 1:
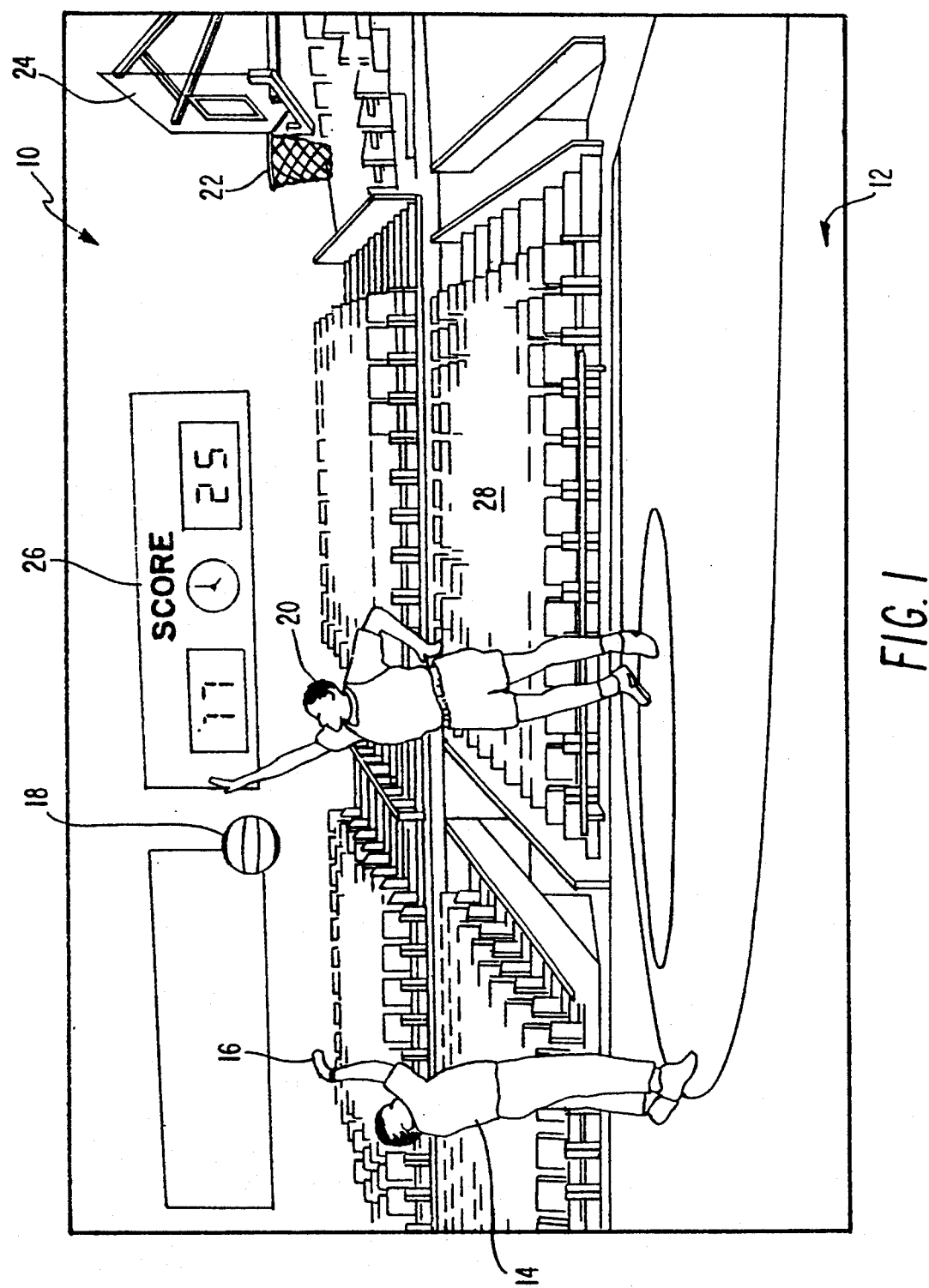
FIG. 1 illustrates the preferred embodiment of the invention in which a real player, wearing a glove having a distinctive color, plays a one-on-one basketball game against a virtual opponent.

The preferred embodiment of the invention 10 is illustrated in FIG. 1. A basketball court 12 is shown over which the image of a real, human player 14 is superimposed. Player 14 wears a distinctively colored glove 16 on either the right or left hand. Glove 16 is chosen so that its colors do not conflict with those of the player 14 or the normal background against which the player appears. The object of the preferred embodiment 10 is for the player 14 to shoot a virtual object, such as basketball 18 into a imaginary, virtual basketball hoop 22 supported by a virtual backboard 24. To make the game 10 more realistic, the player 14 has to shoot over a virtual opponent 20. If player 14 does not shoot the basketball 18 in time, the virtual opponent 20 may steal the ball from him and slam dunk it into the virtual basket 22. Also, player 14 may lose the virtual basketball 18 if the trajectory and velocity of the ball 18 are not such as to substantially bring it into the vicinity of the virtual basketball hoop 22. Each time player 14 makes a successful shot, the score board 26 will give him or her an appropriate point. Conversely, if the virtual opponent 20 is successful in stealing the ball 18 and making a basket, the opponent 20 receives a score. Typically, the game 10 times out after about 60 seconds and the player 14 or 20 with the highest score, as shown on scoreboard 26, wins. The basketball environment 12 can also include a variety of other visual props such as grandstands 28 filled with virtual fans.

FIGS. 2A-2D schematically illustrate the electronics and hardware that implement the preferred embodiment of invention 10 illustrated in FIG. 1. The manner of operation of the electronics illustrated in FIGS. 2A-2D is explained in further detail in FIGS. 5-13C, which are discussed subsequently in this disclosure.

Figure 2A:
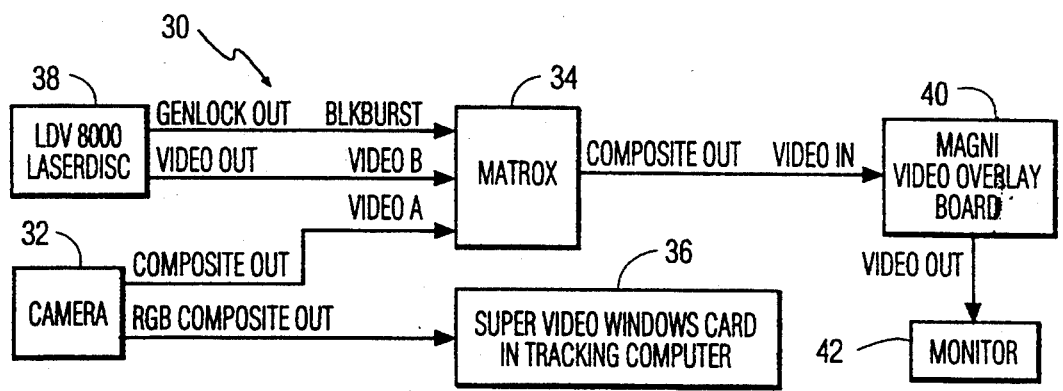
FIG. 2A is a schematic of the video elements that comprise the preferred embodiment of the invention illustrated in FIG. 1.

FIG. 2A illustrates the video wiring schematic 30 of the preferred embodiment 10. A camera 32 scans the player 14 and produces an output to Matrox 34. Camera 32 also interacts with Super Video Windows card 36 which is part of the tracking computer system. Matrox 34 also receives an input from LDV 8000 laser disk 38 and produces an output for the Magni video overlay board 40 which in turn drives monitor 42. Monitor 42 preferably comprises a multi TV large screen display in which nine large catherode ray tubes are organized in a three row by three column array. Other types of prior art large screen displays would also be appropriate for the invention.

Figure 2B:
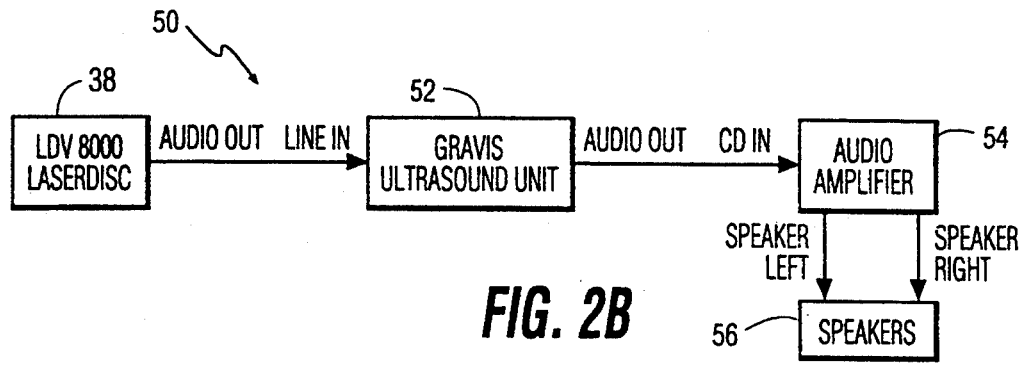
FIG. 2B is a schematic of the audio elements that comprise the preferred embodiment illustrated in FIG. 1.

The audio wiring schematic 50 of the preferred embodiment 10 is illustrated in FIG. 2B. Laser disk 38 also provides an audio output to a Gravis ultrasound unit 52. Ultrasound unit 52 provides an input to audio amplifier 54 which in turn drives speakers 56.

Figure 2C:
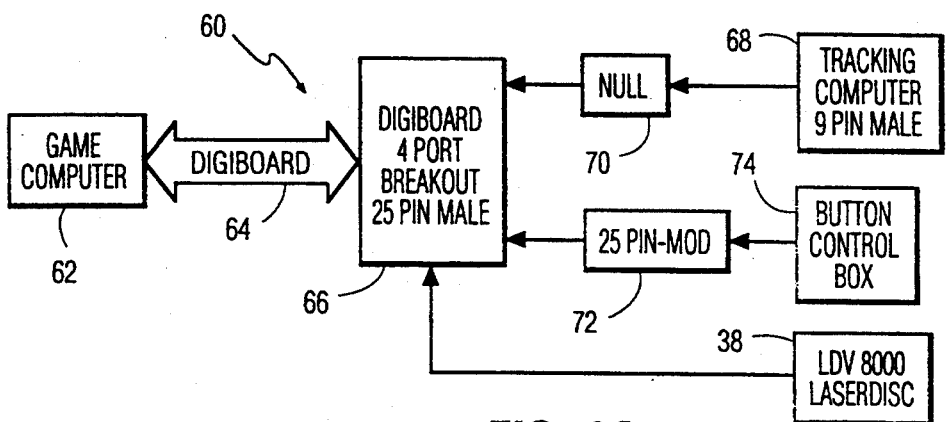
FIGS. 2C and 2D illustrate other related electronic schematics included in the preferred embodiment of the invention illustrated in FIG. 1.
Figure 2D:
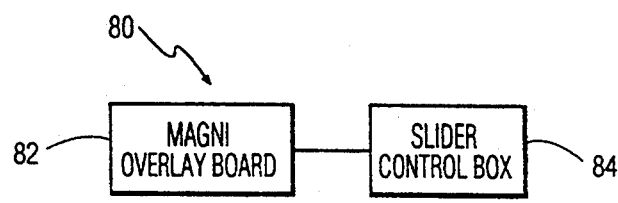

FIG. 2C illustrates the pin connection arrangement schematic 60 of the preferred embodiment 10. Game computer 62, which is understood to include Matrox 34 and Magni video overlay board 40, both shown in FIG. 2A, is connected via digiboard 64 to the digiboard four port breakout 25 pin male connector 66. The nine male pin 68 of the tracking computer is connected via the null pin 70 to connector 66. Similarly, the button control box is connected through twenty-five pin-mod 72 to connector 66. Laser disk 38 is connected to connector 66 in the same fashion. Lastly, FIG. 2D illustrates electronic schematic 80 which shows how the Magni overlay board 82 is connected to the slider control box 84.

Figure 3:
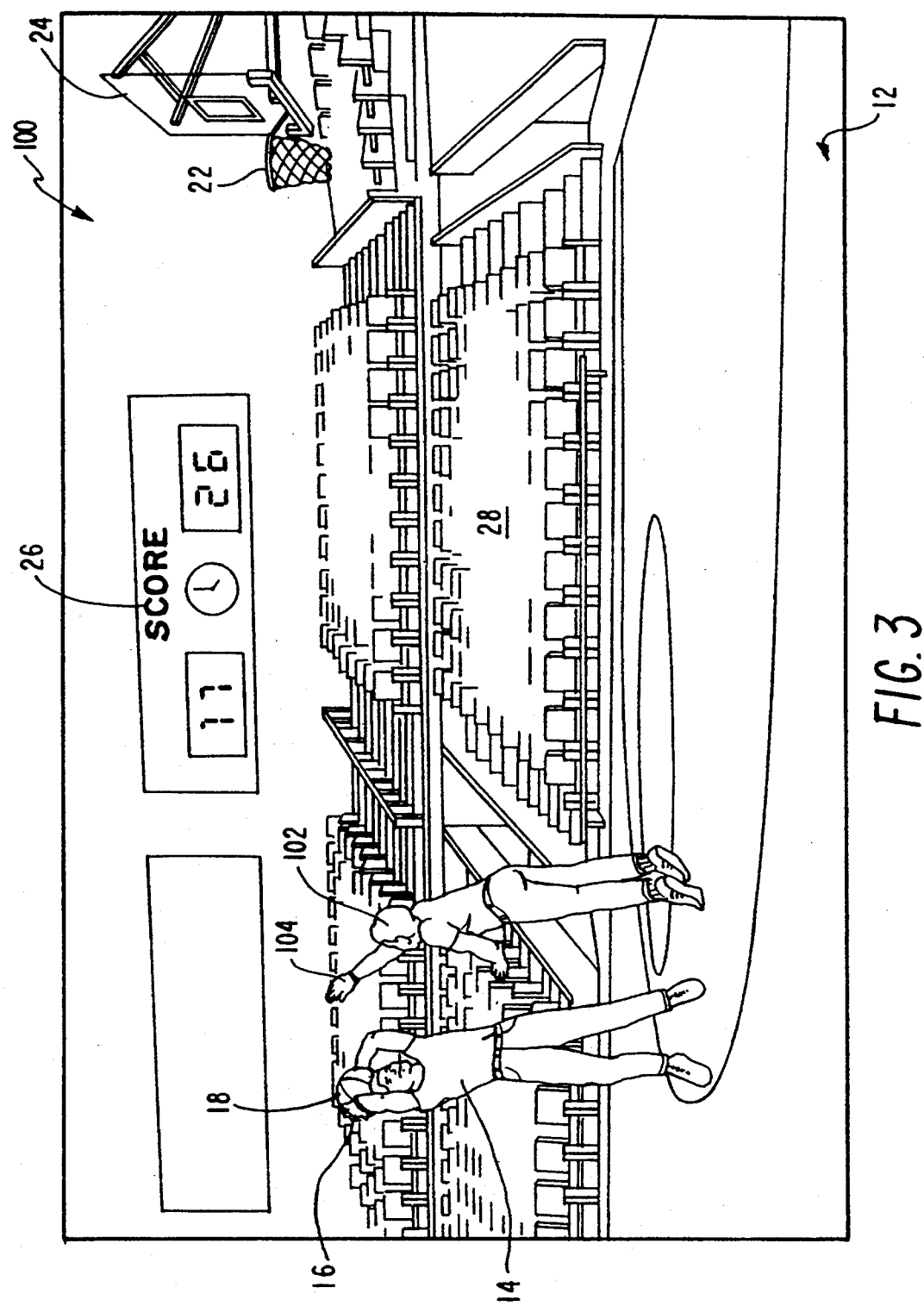
FIG. 3 illustrates an alternative embodiment of the invention in which two real players, wearing different distinctly colored gloves, play one-on-one against each other in a virtual basketball setting.

A two player alternative embodiment 100 is illustrated in FIG. 3. The alternative embodiment 100 is played in a basketball stadium 12 using a first human player 14 who wears a glove of a distinctive color 16 just like in the preferred embodiment 10 illustrated in FIG. 1. As before, the object of the game is to place the virtual basketball 18 through the virtual hoop 22 attached to the virtual backboard 24. Score is kept on the scoreboard 26. Unlike the preferred embodiment 10, however, the alternative embodiment 100 contemplates a second human player 102 instead of the virtual opponent 20 illustrated in FIG. 1. The second human player 102 also wears a distinctive glove 104. The distinctive color of glove 104 is different from the color of glove 16. Both gloves, however, have colors that are not found, either on the individuals 14 or 102, or on the background against which their images are scanned. The alternative embodiment 100 is played similar to the preferred embodiment 10, except that either player 14 or 102 can steal the virtual basketball 18 from the other and put it through the goal 22.

Figure 4:
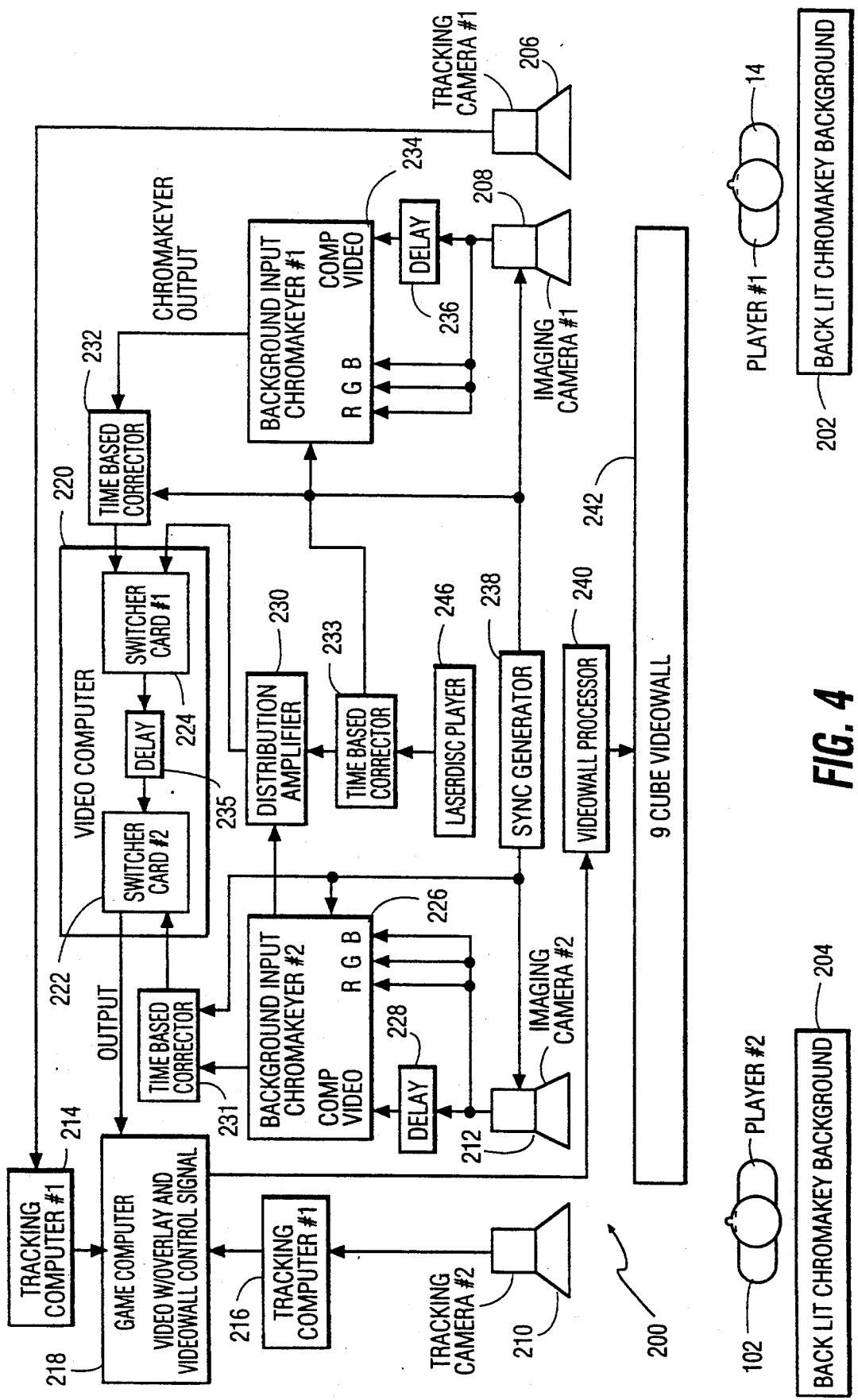
FIG. 4 is an electronic schematic of the alternative embodiment of the invention illustrated in FIG. 3.

FIG. 4 is an electronic and mechanical schematic 200 of the system behind the alternative embodiment 100 illustrated in FIG. 3. Each of the players 14 and 102 are scanned against a backlit Chromakey background 202 and 204, respectively. The image of player 14 is captured by a first imaging camera 208 and the image of the second player 102 is captured by a second imaging camera 212. In addition, a first tracking camera 206 tracks the glove 16 of the first player 14 and a second tracking camera 210 tracks the glove 104 of the second player 102. The output from the first tracking camera 206 is fed to a first tracking computer 214 which in turn feeds game computer 218. Similarly, the second tracking camera 210 feeds a second tracking computer 216 which also provides an additional input to the game computer 218. The first and second imaging cameras 208 and 212 receive their sync signal from sync generator 238. The outputs, respectively, from the first and second imaging cameras 208 and 212 go to a first and second Chromakeyer unit 234 and 226, respectively. Another portion of their signals is transmitted through delay lines 236 and 228 and separated as red, green and blue (R,G,B) components as additional inputs to the first and second Chromakeyer units 234 and 226. The outputs from the first and second Chromakeyer units and 234 and 226 provide inputs, through time based correctors 232 and 231, respectively, to a first and second switcher card 224 and 222 of the video computer 220. The background input from the second Chromakeyer unit 226 provides an input to distribution amplifier 230 which also receives an input from laser disk player 246 through time based corrector 233. The output from distribution amplifier 230 provides a second input to the first switcher card 224. The output from the first switcher card 224 also provides an input to the second switcher card 222. The output from the second switcher card 222 provides an additional input to the game computer 218. Game computer 218 provides for the overlay of the images of players 14 and 102 against the background and also provides the video wall control signal. The output from game computer 218 provides an input to video wall processor 240 which in turn drives the nine CRT cube video wall 242.

A third possible embodiment of the invention is the simulation of near weightlessness against a moon-like backdrop. A single individual, though there could be more than one, has the identifiable color glove on one hand. The system recognizes movements of the glove and, therefore, if the moon walker makes a rapid upward or downward movement, the system will take his or her entire image and move it a significant distance over the moonscape, thereby simulating walking a low gravity environment.

Figure 5:
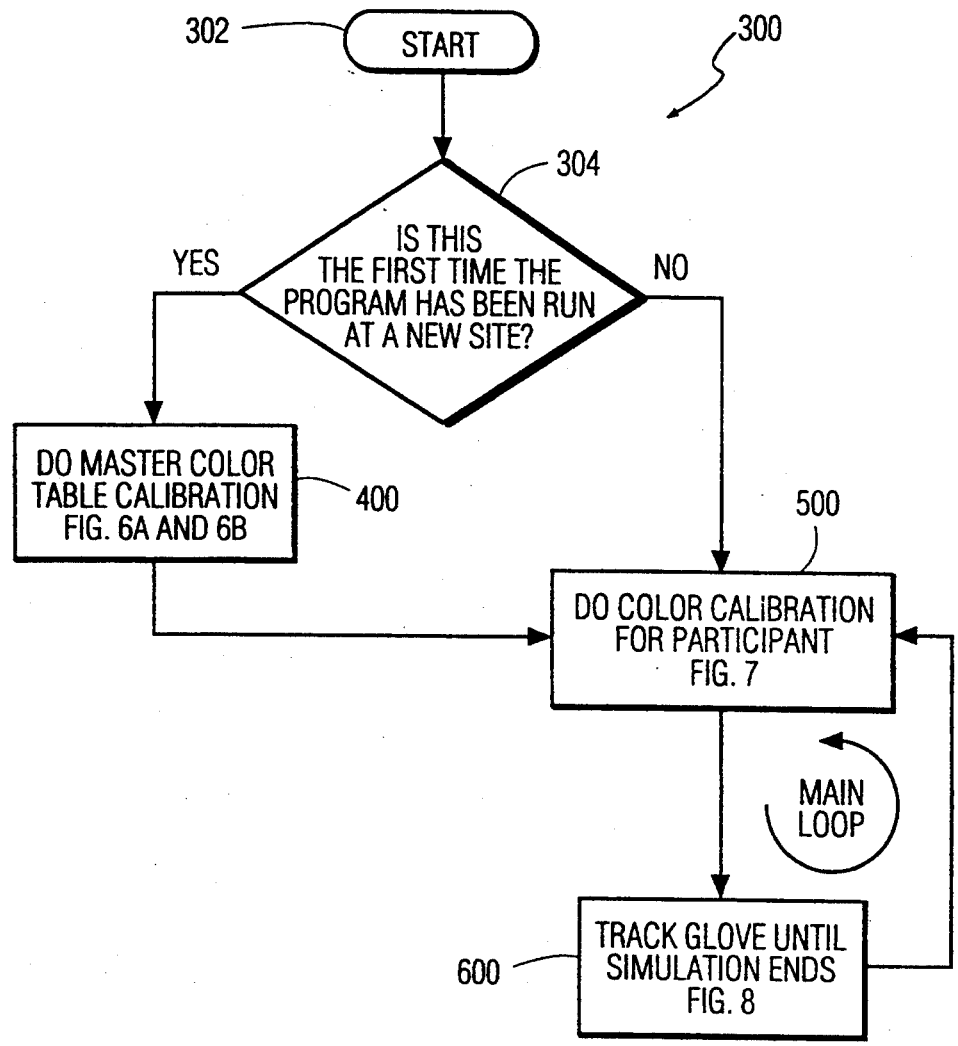
FIG. 5 is a global flow chart illustrating the overall invention.
Figure 6A:
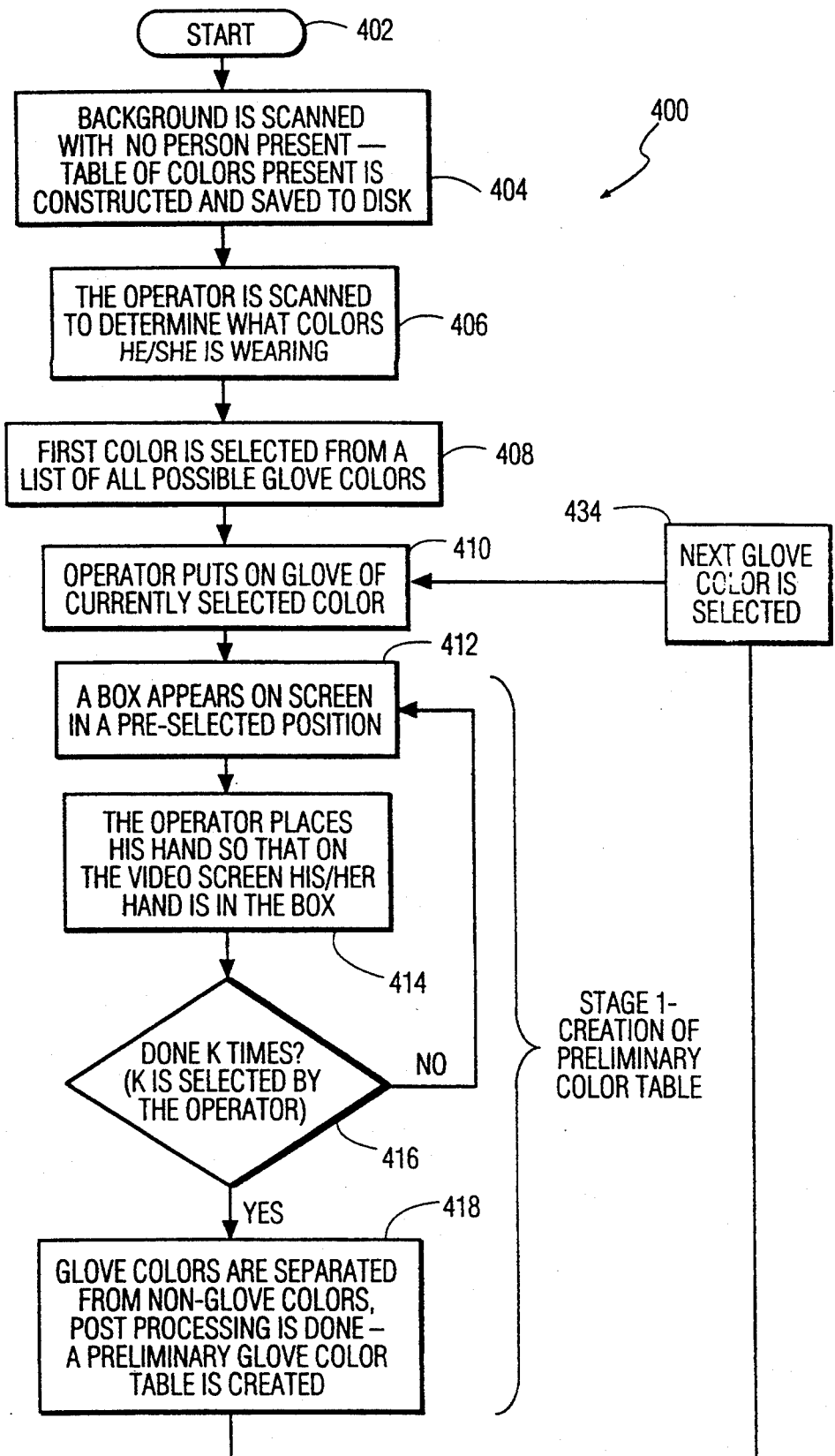
FIG. 6A and 6B illustrate the method steps for creating the master color table.
Figure 6B:
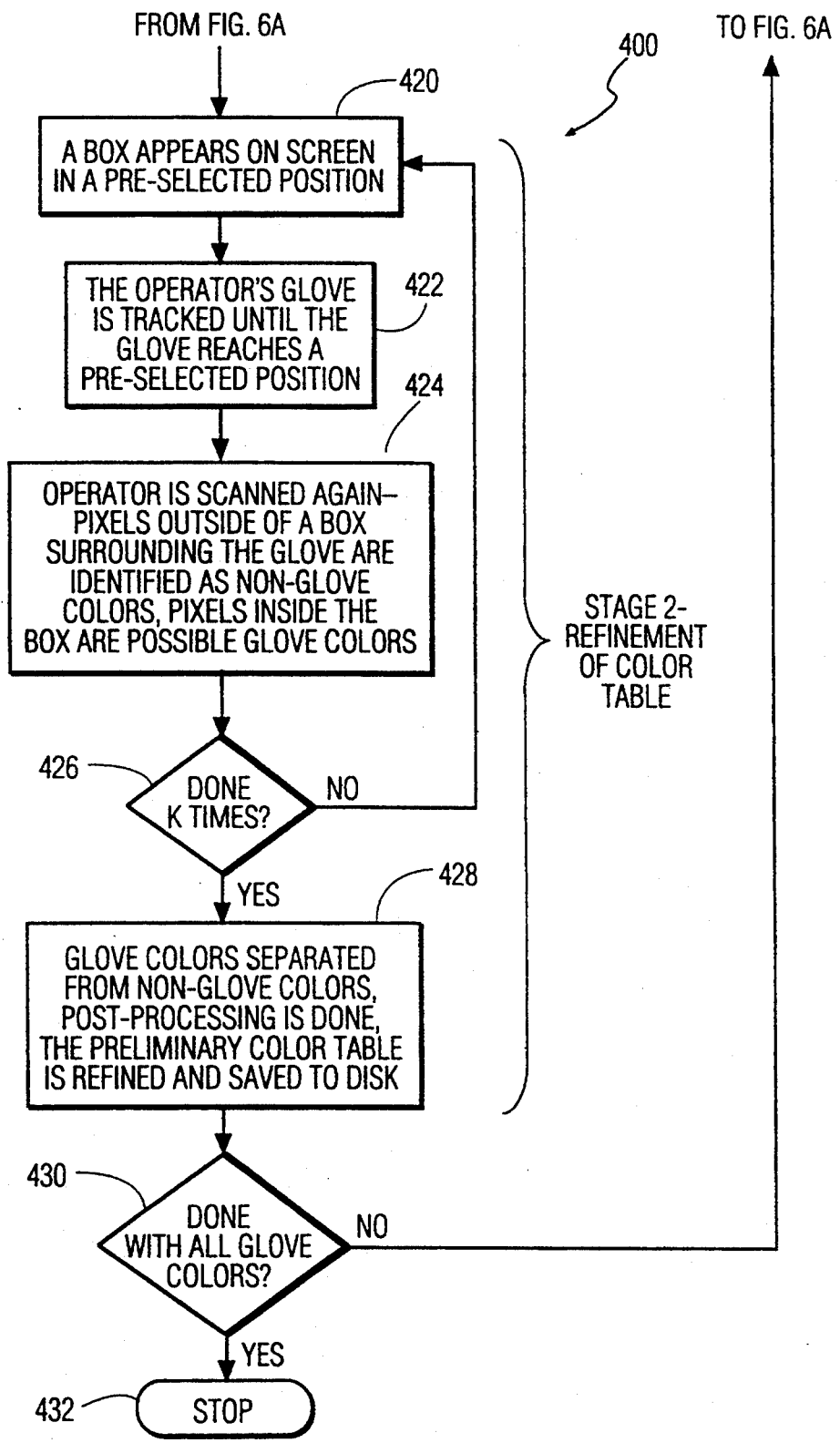
Figure 7:
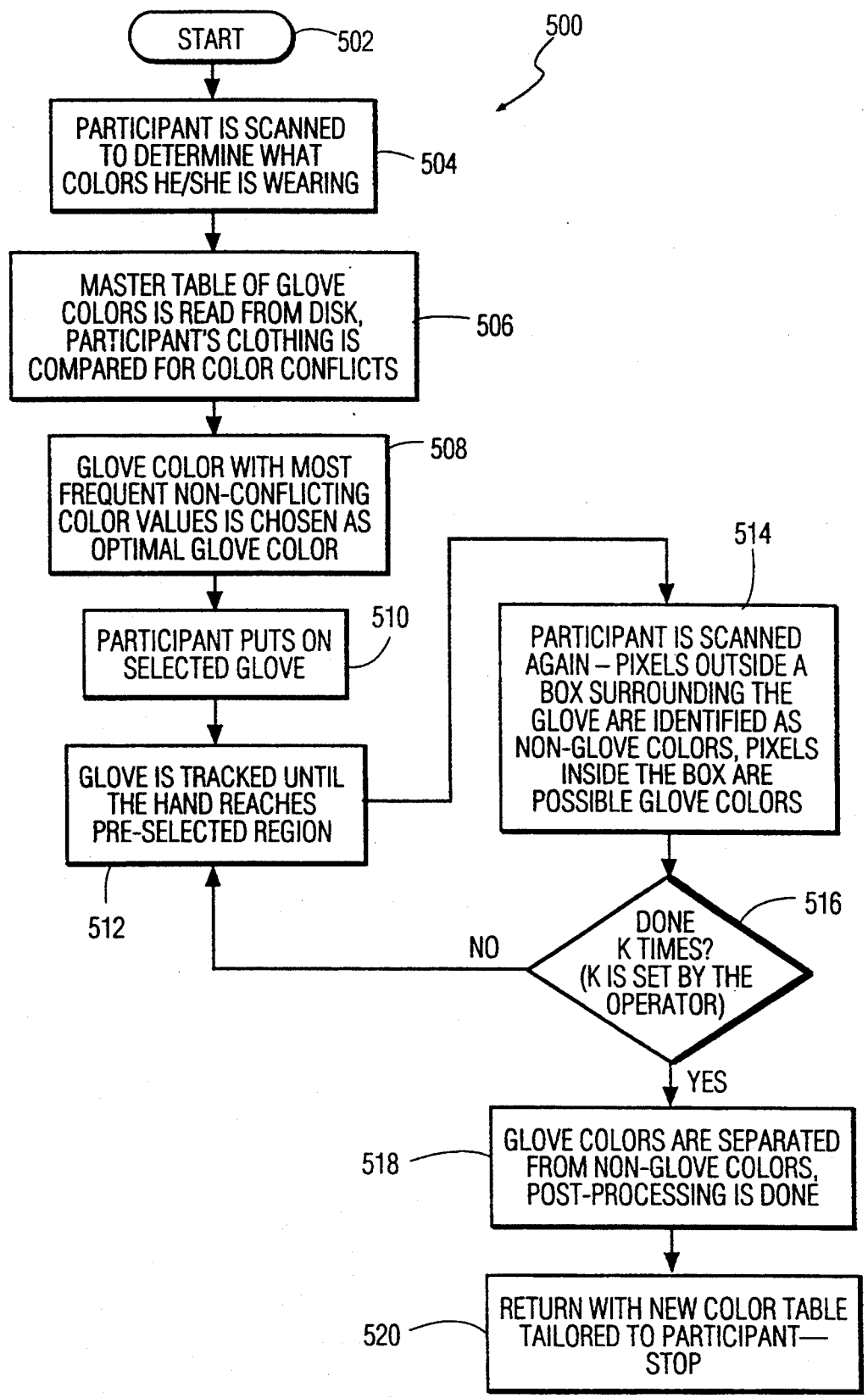
FIG. 7 illustrates the method steps for calibrating the system for a specific player and a specific glove.

FIG. 5 illustrates a global flow chart 300 of the basic tracking system. After the start 302, the system asks if this is the first time the program has been run at a new site as illustrated by step box 304. If this is the first time it has been run at that site, then the system performs a master color table calibration, the steps of which 400 are illustrated in FIGS. 6A-6B. It is generally only necessary to do a master color table calibration whenever the site is changed. Next, it is necessary to perform a color calibration for the participant as illustrated in step 500 and as shown in FIG. 7. Once the system 300 is initialized, the game 10 enters into its main loop where it tracks the glove until the simulation is over as illustrated by step 600 and summarized in FIG. 8.

The overall steps 300 are performed by preferred embodiment 10 with the following elements:

486DX2/66 LOCAL BUS (Game Computer)
    Hard Drive
    Actix Graphics Engine 32VL+2Mb SVGA
    Magni Video Overlay Board
    Matrox Illuminator Pro
    Gravis Ultrasound
    Digiboard 4 port
486DX/33 (Tracking Computer)
    Hard drive (40Mb min.)
    VGA card
    Super Video Windows card
LDV-8000 LASERDISC PLAYER
SONY VIDEO CAMERA
SONY AUDIO AMPLIFIER
2 SPEAKERS
VGA MONITOR
CABLES
    BNC cables
    9 pin to RGB
    Illuminator Pro input cable & 2 BNC adaptors
    Illuminator Pro output cable
    RCA cables
    Speaker wire
    25F to 9F with null modem
    4 wire modular
    25F to Laserdisc 15M
    9M to 9F (long)
    Magni Modular cable (8 conductor)
    Power Cables
    VGA extension cables
    Keyboard extension
MISC.
    Keyboard
    VGA terminator
    RCA to mini adaptors
    Digiboard 4 port breakout box
    25F to modular (4 conductor)
    Camera Power Supply
    Magni Control Box
    2 Mice The initial training of the system 10 enables it to recognize a set of glove colors. The glove colors are learned by using the following procedure after the start, illustrated by step 402, has begun.

First, the background is scanned 4 or 5 times, and a table of the colors present is constructed. All color values found in this table are classified as non-glove colors. See step 404 of FIG. 6A. In addition, this table is stored as a table of background colors for use with subsequent height/width measurement and/or outline tracking.

Next, a number of images of the system operator, while wearing neutral-colored clothing, are scanned. A table of all of the color values found in these images of the operator is constructed. Any color value in this table is identified as a non-glove color. See steps 404 and 406 of FIG. 6A.

Next, the operator dons the colored glove which he or she wishes to train the system to recognize as illustrated by steps 408 and 410. A box then appears in a preselected position on the screen, as illustrated by step 412, and the operator then places his hand in such a fashion that it appears in the box on the video screen as shown by step 414. The operator keeps his hand in the box until prompted to move it. Tables are constructed of all the color values present inside the box containing the hand and of all the colors present outside the box. In addition, the frequencies of occurrence of color values inside the box are tabulated. The colors outside the box are identified as background colors. The box contains both the gloved hand and some background pixels, so the colors inside the box are identified as possible glove colors. The procedure is repeated several times, as illustrated by step 416, with the box located in different places so that both hand and operator are seen from a variety of angles. Glove colors are then separated from non-glove colors in step 418 and post processing is done, thereby creating a preliminary glove color table.

The second stage in the generation of the master color table is illustrated by steps 420–428. The information in the color table is further refined to improve its quality. A box, as suggested by step 420, appears on the screen in a preselected position. The operator's glove is then tracked using the color table generated by steps 402–416 until the hand reaches a preselected position as shown by step 422. The operator is then scanned again such that pixels outside of a box surrounding the glove are classified as non-glove colors and pixels inside the box are classified as possible glove colors and their frequencies of occurrence are tabulated, as illustrated in step 424. The process is repeated several times, as illustrated by step 426. Next, glove colors are separated from non-glove colors and further post processing is performed. The refined color table is then saved to disk. Once this is done with the first colored glove, then the process is repeated with all other colored gloves, as illustrated by step 430, until each different color of glove has had a master table of glove colors created for it. At this point, the initialization is concluded as illustrated by step 432.

The ultimate goal of the generation of the master color tables illustrated in FIGS. 6A and 6B is to create, for each different colored glove, a table of colors found exclusively in that color glove. For each glove, the final table is constructed by taking the table of possible glove colors found inside the boxes and removing all colors previously classified as non-glove colors. Gaps in the tables are filled in and spurious pixels are removed during subsequent post-processing. The final table is saved to disk as is the table of the frequencies of occurrence of the pixels in the final color table. The entire procedure of generating these master color tables is performed once per site.

The next process is to determine which glove the participant or player 14 should wear. That process 500, which involves calibration of the participant, is illustrated in the steps shown in FIG. 7. After the start 502, the player is scanned to determine what colors he or she is wearing, see step 504, and then a master table of glove colors is read from disk and the player's clothing is compared for color conflicts as shown in step 506. The color with the most frequent non-conflicting color values is selected, as shown in step 508, as the optimal glove color. Next, the player 14 puts on the selected glove, as shown in step 510, and the glove is tracked, as shown in step 512, until the hand reaches a preselected region. As shown in step 514, the player or participant is scanned again and the pixels outside a box surrounding the glove are identified as non-glove colors, and pixels inside the box are identified as possible glove colors. The process is repeated several times, as shown by step 516, after which the glove colors are separated from non-glove colors and further post-processing is performed. Once step 518 is completed, the participant or player calibration process 500 returns with a new color table tailored to the player or participant who will play the game, as shown by final step 520.

In summary, for each glove color that the system has been trained to recognize, the amount of conflict is computed between the glove's color and the background table as described above. A glove color is chosen which maximizes the average number of pixels in the glove which do not conflict with the background.

Once the glove color is determined, according to the process 500 illustrated in FIG. 7, the table of glove colors is refined by the following procedures.

Initially, the player dons the colored glove which has been selected by the system 500. The system places virtual objects on the screen which the player must touch. Using the master table of glove colors from the initial training, the system is able to automatically determine when the gloved hand touches the objects. When the hand enters a box, which is not visible to the person, but which surrounds the objects to be touched, tables of possible glove colors and non-glove colors are constructed in the same way as in the initial training session. This procedure is repeated several times with the objects located in different places so that both hand and person are seen from a variety of angles.

A new refined table of glove colors is constructed by combining the master glove color table for the selected glove color with the current table of possible glove colors found inside the boxes, and then removing all colors currently classified as non-glove colors. Spurious pixels are removed and gaps in the table are filled in during subsequent post-processing. This new table of glove colors is used for tracking the hand during the game. The post-processing operation is further described below.

In order to understand the problem, it is important to know that during calibration, two tables are created, to wit:

1. A table of non-glove colors present on the person and in the background; and, 2. A table of colors which are possible glove colors.

From these two tables, it is necessary to create a single table of glove colors which are not duplicated in the participant's clothing, skin, or in the background, i.e. color values which are unique to the glove.

What is done is the following:

A color is a glove color if (1) the color is found in the table of possible glove colors; and, (2) the color is not found in the non-glove table.

The foregoing process is not as simple as it may appear for two reasons. First, there is a very large set of possible colors, over two million, which can be distinguished by the digitizing board. Even on a glove which is perfectly uniformly dyed to a single color, there may be many thousands of possible color values which the digitizing board recognizes, due to subtle differences in lighting and hand orientation, and due to edge effects from averaging the glove color with adjacent arm/shirt pixels and/or background pixels. In a typical training session, only a fraction of the possible glove colors and background colors will be observed. The system for classification will fail for pixels not directly observed or otherwise accounted for during training, so it is important to take measures to improve classification. Second, there is some noise present in the system, so some pixels will be spuriously misclassified.

We wish to classify all color values as either glove color or non-glove color. In order to remedy the first problem above, the following assumption is made: Suppose we have a color value C which is classified as "X" (where "X" is either "glove color" or "non-glove color"). Then all other color values $C^1$ with chroma and luma values sufficiently close to C will have the same classification "X." This assumption is clearly not true for all color values—if it were, then by induction, all color values must have the same classification. However, it is a useful starting point.

Figure 13A:
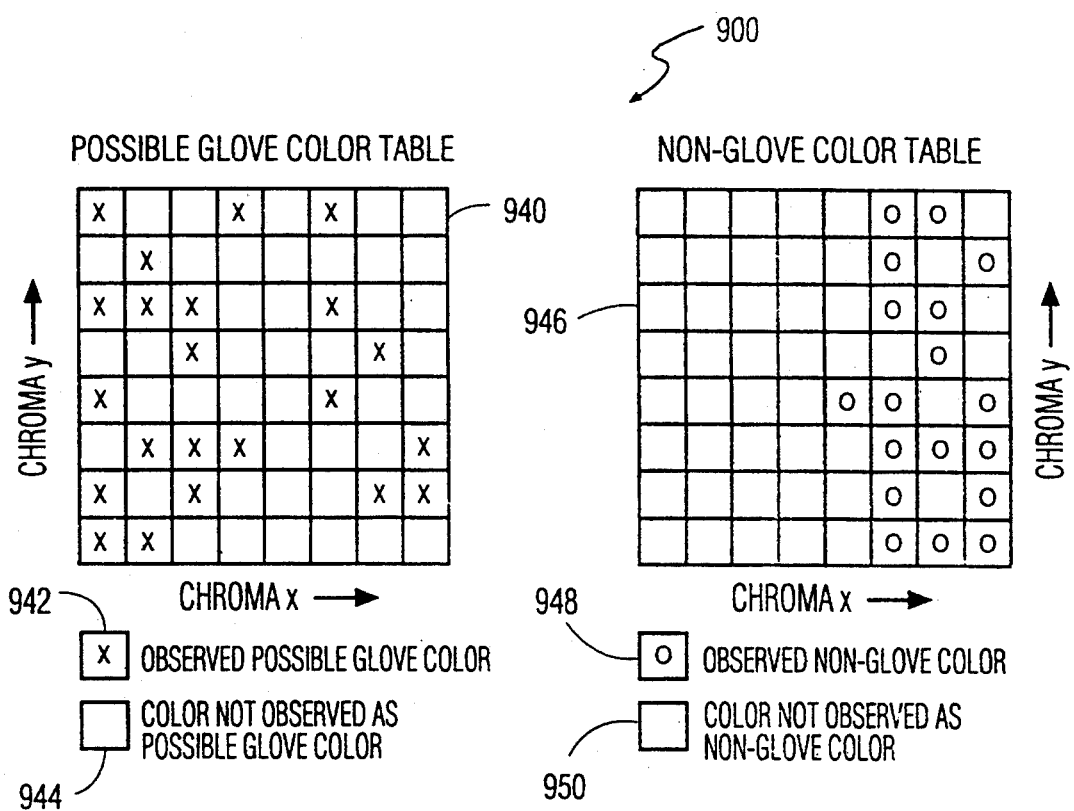
FIG. 13A illustrates a sample possible glove color table and a sample non-glove color table.
Figure 13B:
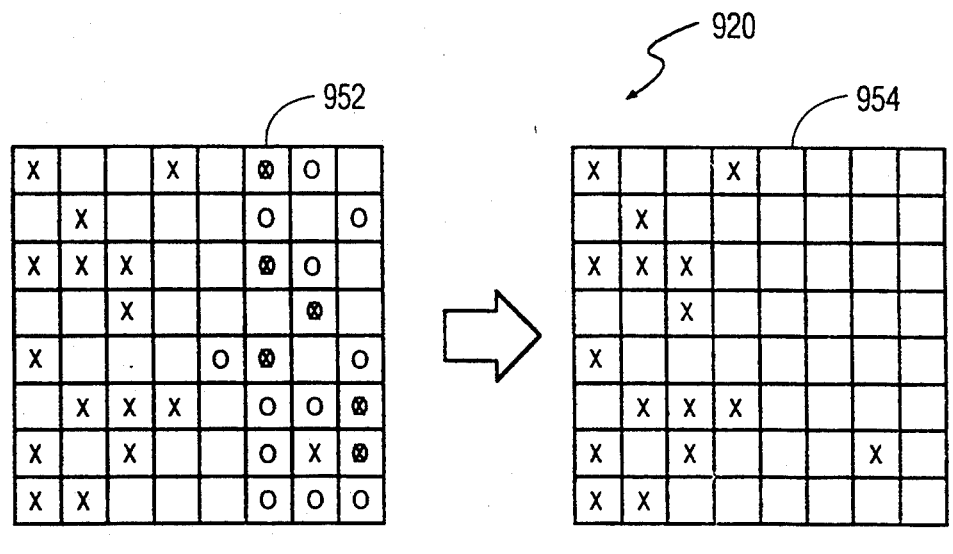
FIG. 13B illustrates the initial separation of glove colors from the table of possible glove colors.

The extraction of the table of glove colors from the table of possible glove colors is illustrated as process 900 in FIGS. 13A–13E. A sample possible glove color table 940 and non-glove color table 946 are illustrated in FIG. 13A. Note that this illustration is of a single luma layer of the tables. All tables diagrammed here are represented as two dimensional slices of three dimensional tables. All non-glove colors 948 are removed from the table of possible glove colors 940 as illustrated by process 920 in FIG. 13B, and we are left with a table of observed glove colors 954 and a table of observed non-glove colors 946. The removal process proceeds in a similar manner for all luma levels.

First it is desirable to eliminate any spurious pixels. This procedure 960 is described in detail below and illustrated in FIG. 13C. The denoised glove color table 966 becomes the new glove color table and is used by the gap-filling procedure which follows.

Figure 13C:
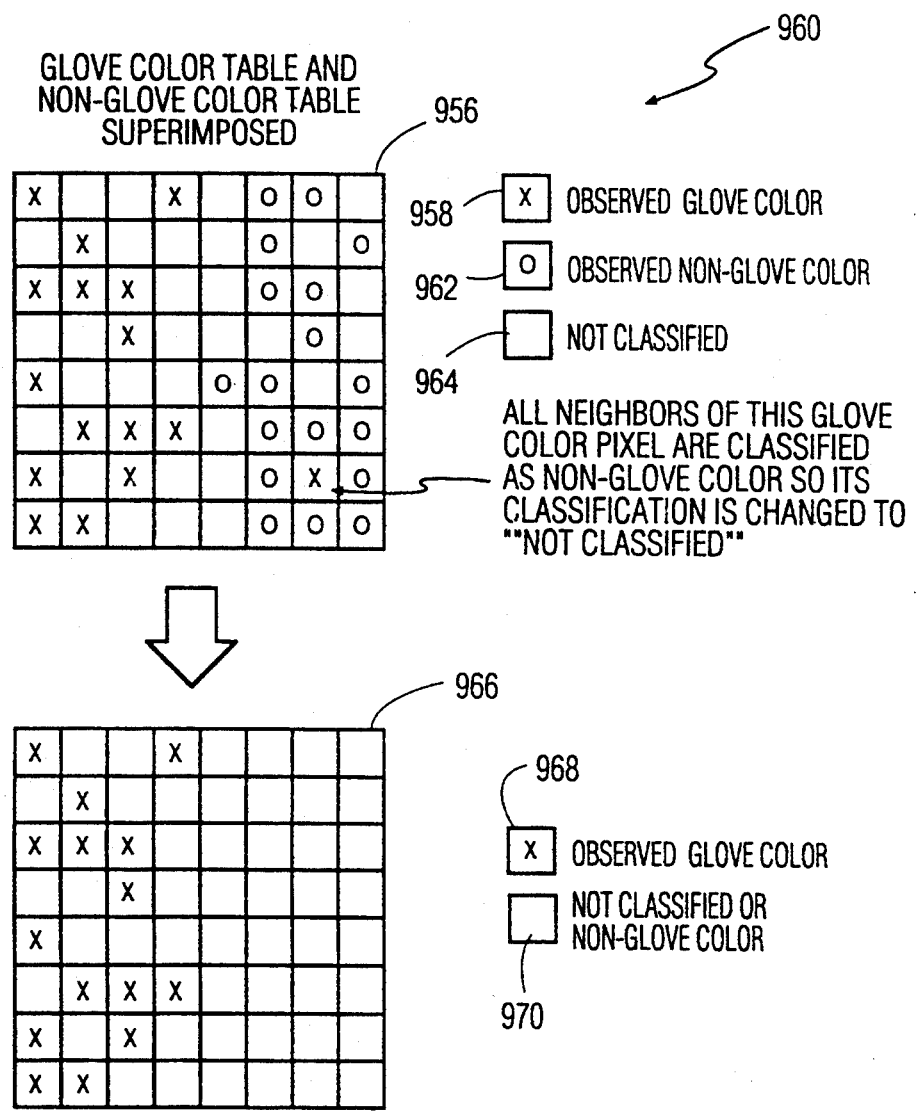
FIG. 13C illustrates the process by which spuriously classified pixels are eliminated.
Figure 13D:
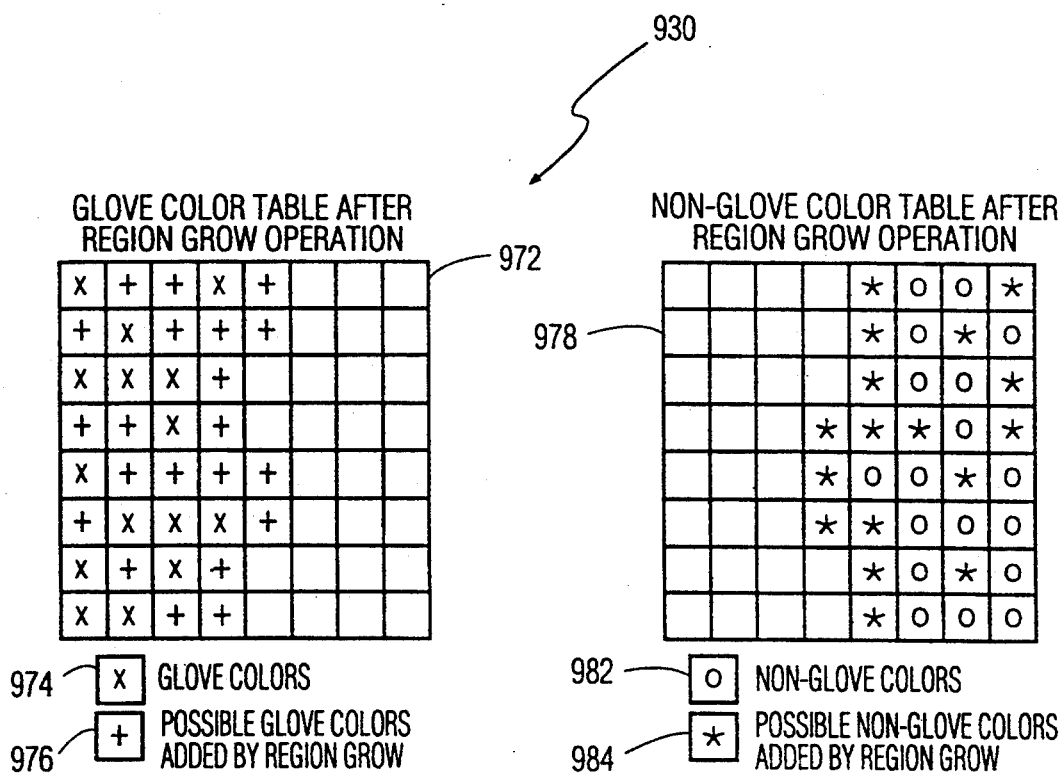
FIG. 13D demonstrates the effect of a region-grow operation on a table of glove color values and on a table of non-glove color values.

Next it is desirable to fill in gaps in these tables. First, it is useful to perform a region grow operation on the table of glove colors 966 and on the table of observed non-glove colors 946 as illustrated by process 930 in FIG. 13D. The operation "region grow" is defined on a color table T as follows: For each color value (X,Y,L) (where X,Y, and L are the color's chroma x, chroma y, and luma values, respectively) in T, all color values $(X^1,Y^1,L^1)$ such that either (1) $L=L^1$ and max $(|X-X^1|, |Y-Y^1|)=1$, or (2) $|L-L^1|=1$ and $X=X^1$ and $Y=Y^1$ are added to the table. The region grow operation adds to each table all the neighbors of each pixel in the table. By our assumption, neighbors of a color in a table T belong to the same table T. Of course, our assumption does not always hold true, and there will be colors which are neighbors of both glove colors and non-glove colors. Such colors are deemed to be of ambiguous classification, and they are discarded from both tables as illustrated by process 980 in FIG. 13E. The process of filling gaps as illustrated in FIGS. 13D and 13E is repeated one to two times. The end result is the smoothed table of glove colors 992.

The process occurs in several stages because at each step the chances increase that the assumptions about the region-grown colors are false increase. In other words, the classification of initially observed colors is probably correct. The classification of the neighbors of the observed colors is less accurate, and the classification of the neighbors of the neighbors of the observed colors is more suspect. The separations are performed in stages so that it is possible to see conflicts between observed glove and observed non-glove colors rather than, say, between neighbors of neighbors of observed glove colors and observed non-glove colors, and so on. The system thus compares data whose accuracy is comparable at each step.

In order to cope with the noise, which is the second problem, it is necessary to make a similar assumption, namely, that if we classify and observe color as "X," then the system should also classify similar colors as "X." If we then find a color classified as a glove color, yet all neighboring colors are classified as non-glove, then it is reasonable to eliminate the glove-colored classification of the isolated spot in the region. This process of elimination is illustrated in FIG. 13C. The end result is the table 966.

The position of the hand of the player is determined by locating collections of pixels in the digitized image of the person to be tracked which have color values contained in the table of glove colors. Because the image is quite large (over 300,000 pixels) and because quick search time is required to give real-time position information, the search must be done in a highly efficient manner. The use of a digitizing board with a frame buffer enables much more efficient searches.

Figure 8:
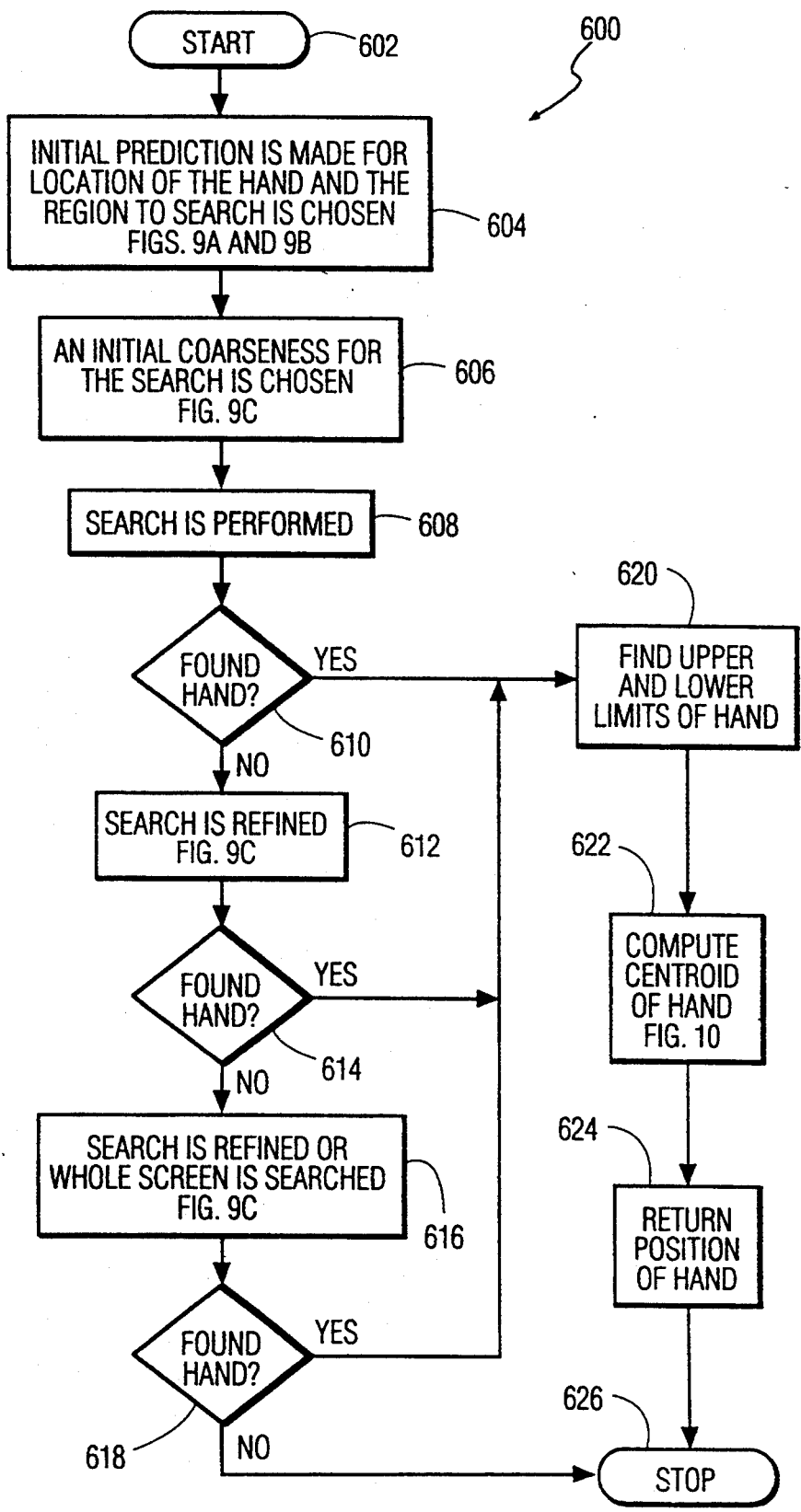
FIG. 8 is a flow chart illustrating the search steps performed by the tracking software.

An overview of the tracking search technique 600 is illustrated in FIG. 8. The process starts which search step 602. Thereafter, an initial prediction is made for the location of the hand and the region of the frame buffer to search as shown in step 604 and as further described in FIGS. 9A and 9B. In the next step 606, an initial coarseness for the search is chosen as further described with reference to FIG. 9C. A search is subsequently performed, as shown by step 608, and a determination is made to see if the gloved hand is found as shown by step 610. If the gloved hand is not found, then the search is refined in step 612, as also illustrated in FIG. 9C, and another determination is made to see if the hand is found as shown by step 614. If the second determination 614 indicates that the hand is not found for the second time, then the search is further refined or the whole frame is searched as illustrated by step 616 and as is also illustrated in FIG. 9C. If after the third attempt the hand is not located, in steps 616 and 618, then the system 600 is told to stop as illustrated by step 626. If at any time, the gloved hand is located in steps 610, 614 or 618, then the upper and lower limits of the hand are identified in step 620. Thereafter, the centroid of the hand is determined by the technique illustrated in step 622, as shown in FIG. 10 and as described in detail below. Subsequently, the system returns the position of the hand as shown by step 624 and, after the game 10 is completed, the tracking system comes to a full stop as shown by step 626.

Figure 11:
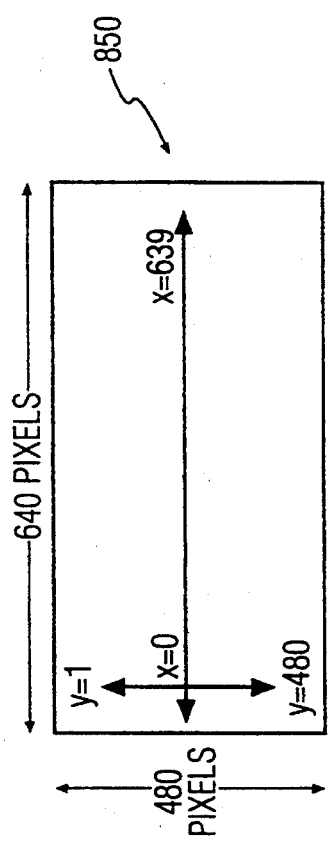
FIG. 11 illustrates a typical frame of 640×480 pixels as stored in a frame buffer.
Figure 12:
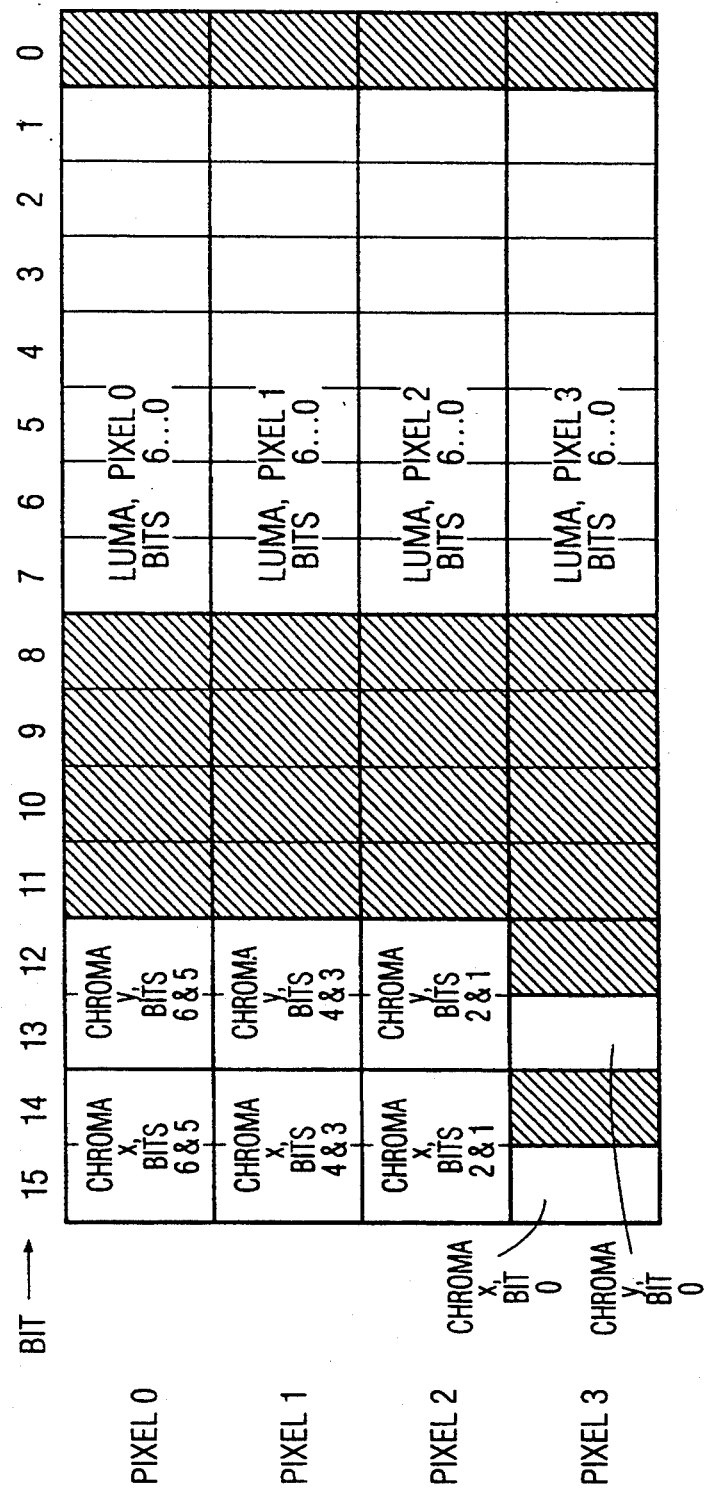
FIG. 12 illustrates the manner in which the chroma X, chroma Y and luma information are stored within the frame buffer with the most significant bits of the chroma X and chroma Y values stored in the first byte of the 8 byte sequence, and a luma value is stored in the second byte.

The frame buffer in the system enables video fields to be searched rather than searching full video frames, a technique which speeds search time considerably. The time required to acquire a field is 15 milliseconds. rather than the 30 milliseconds required to acquire a full frame. A typical frame 850 is illustrated in FIG. 11. A conventional frame 850 is 640 pixels wide by 480 pixels high. Therefore, a full frame is considered to be 640×480 pixels. A "field" is defined in this case as half of a frame, consisting either of only odd horizontal lines (an odd field) or only even horizontal lines (an even field).

Because the motion of the hand is continuous, and because the tracking system obtains frequent position data, the position of the hand from one field to the next can be predicted fairly accurately. By first searching near the predicted position of the hand, search time can be cut dramatically. Depending upon the amount of previous data available, the predictive search is performed in one of three ways.

Figure 9A:
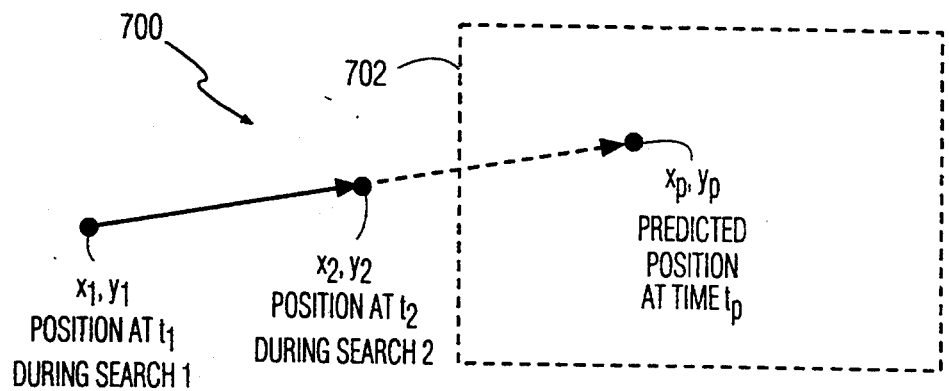
FIG. 9A illustrates the first stage of a predictive position search.
Figure 10:
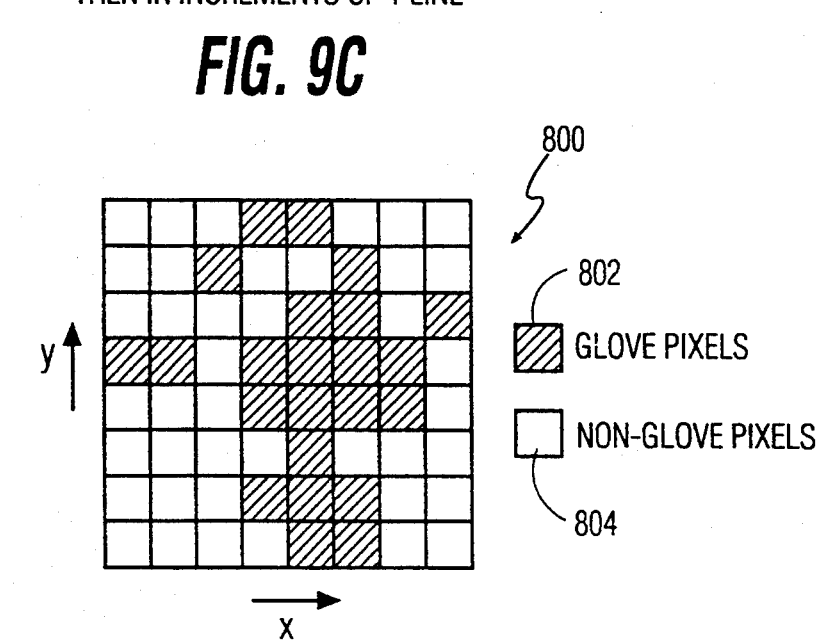
FIG. 10 illustrates the technique employed for locating the centroid of the glove.

First, as shown in FIG. 9A, if the system has correctly located the hand in both of the last two fields searched, then those last two positions are used to determine the position and velocity of the hand in the previous field, and the predicted position is obtained by assuming that the velocity of the hand remains constant between the previous field and the current one. This prediction is accurate except when the hand accelerates or decelerates rapidly. As shown in FIG. 9A, the first predictive technique notes the position at time $t_1$ as $x_1$, $y_1$, and $t_2$ as $x_2$, $y_2$. Using this information, the system can fairly accurately predict the position of the hand during the next interval $t_p$ as being at point $x_p$, $y_p$. Using this information, the system searches a relatively small field 702 rather than slowly processing a full frame of data.

Figure 9B:
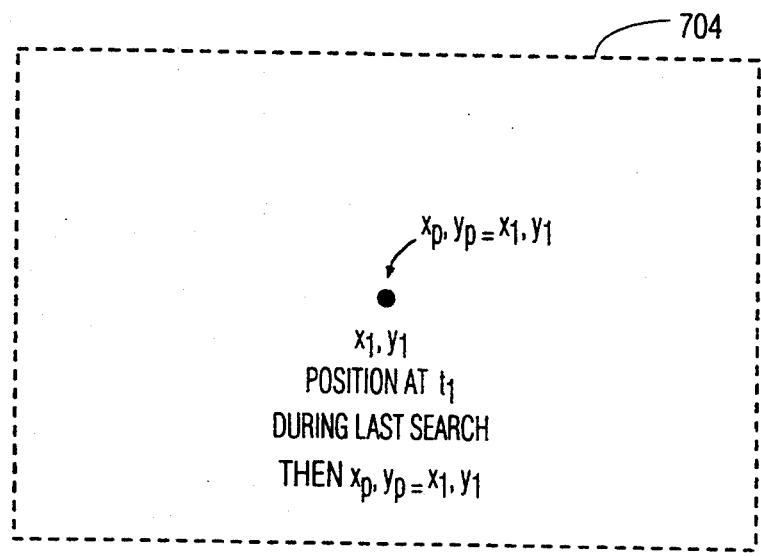
FIG. 9B illustrates the second stage of the predictive search if the glove is not located during the search of the smaller search area illustrated in FIG. 9A.
Figure 9C:
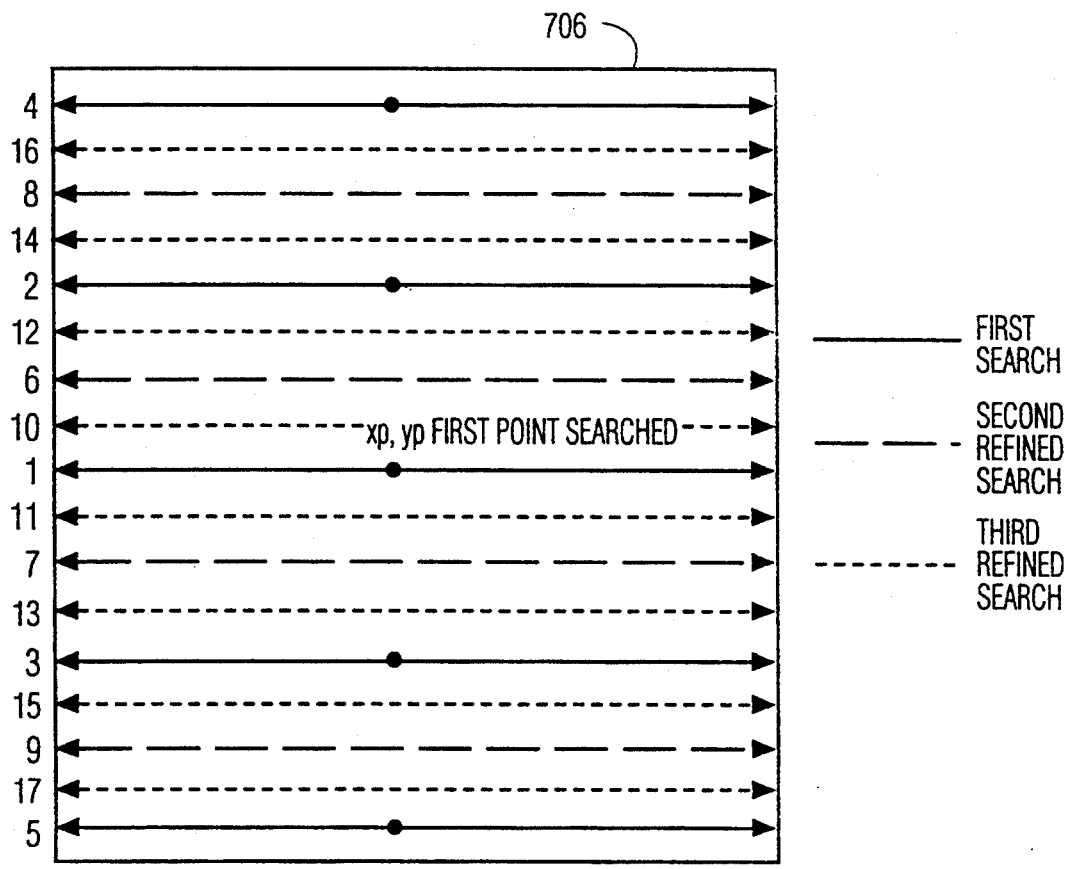
FIG. 9C illustrates the coarse-to-fine technique employed to expeditiously search the predicted glove area shown in FIGS. 9A and 9B above.

Second, if the system did not locate the hand during the last search, as illustrated in FIG. 9B, then the system predicts that the position of the hand will be the same as the last known position. This estimate is less accurate than when velocity data can be obtained, but it still narrows the search considerably. Under this second scenario, a larger search field 704 is searched because of the higher likelihood of error in the predicted hand position.

Third, if the software has not found the hand in the last field search, after the steps illustrated in FIGS. 9A and 9B, then the entire 640×480 frame buffer is searched. This is obviously much slower and time consuming and ultimately creates a jerky motion on the video monitor 42 or 242.

Because, in general, the image of the hand is large with respect to pixel size, it is usually unnecessary to search every single pixel in order to locate the hand. Initially, as shown in FIG. 9C, a coarse search is performed, scanning only every sixteenth line. If this search is unsuccessful, the search is refined, and every eighth line is searched. The process of refinement is continued until either the hand is located or until every line in the field 706 has been searched.

In general, the image of the hand contains a large number of pixels. A single hand position must be determined in some consistent way from this large collection of pixel data. It has been learned that the left uppermost hand pixel, according to earlier attempts, was difficult to accurately locate. Since boundaries of the hand are irregular, it is hard to determine accurately the precise location of the hand. However, according to the preferred embodiment, the system is capable of detecting the centroid of the hand. The initial data 800, after classification, is illustrated in FIG. 10. The data includes glove pixels 802 and non-glove pixels 804. The boundaries of the image are determined by a binary search for edges. It begins by starting at the first hand pixel located and performing the binary search for 2 lines in the frame buffer which are free of hand pixels. Once this is completed, the centroid of all hand pixels within the boundary is computed by the following calculations:

Centroid cx,cy

Let S be the set of glove pixels inside the bounding box (see FIG. 10). Then $$cx = \frac{1}{n} \sum_{(x_i, y_i) \in S} x_i$$

$$cy = \frac{1}{n} \sum_{(x_i, y_i) \in S} y_i$$

where n is the number of pixels in S.

Another advantage and improvement of the present invention makes use of a unique and efficient coding scheme of the color table. The color values for each pixel are spread over eight bytes, i.e. each 2-byte word contains four bits of chroma information and seven bits of luma information. The table of glove colors makes use of twelve bits of chroma information and six bits of luma. In order to verify that a pixel is in the glove, it is, therefore, necessary to check six bytes in the frame buffer. However, the vast majority of color values in a given image do not lie in the glove table. It is, therefore, important to determine if a pixel is a non-glove color with a minimum of effort. It has been learned, fortunately, that the first 2 bytes of each pixel of color information contains enough chroma information to determine for most pixels that the pixel is not of glove color. Therefore, a second glove color table is set up which is indexed by the first four bits of chroma information and the first six bits of luma information. If a pixel is found in the second table which requires only that two bytes be checked, then a full six-byte check is done using the first table. Since most candidates are eliminated by the first two-byte check, this technique saves considerable search time.

Another major unique advantage of the present invention is that it is capable of recognizing hand gestures so that the system knows when the player 14 intends to dribble or shoot a ball. The last ten observed hand positions (x and y coordinates) are kept in an array. The following gestures are then recognized based upon this information:

1. Roundhouse throw (overhand throw): Notation: The x,y cords of the hand at time t are stored for the last 10 observations. The current observation has index 0. The one before has index −1, and before that has −2, etc. So the current hand position and time is x(0), y(0), and t(0). Criteria for roundhouse throw:
    a) At least 9 samples must have been acquired
    b) The current velocity of the hand must exceed a preset threshold Here $v = \sqrt{(vx^2 + vy^2)}$ where $vx = \frac{[x(0) - x(-2)]}{[t(0) - t(-2)]}$ and $$vy = \frac{[y(0) - y(-2)]}{[t(0) - t(-2)]}$$

c) The angle of the current direction of motion must have changed by more than a preset threshold. Thus, $|\Theta_2 - \Theta_2| >$ threshold.

Here $\Theta_2 = \tan^{-1}[(y(0) - y(-2))/(x(0) - x(-2))]$ $\Theta_1 = \tan^{-1}[(y(-4) - y(-6))/(x(-4) - x(-6))]$ 2. Dribble (as with a basketball) Criteria for dribble:
    a) At least 9 samples must have been acquired.

b) The current velocity of the hand must exceed a preset threshold (this threshold is different from that for a roundhouse throw)

$$\text{Here } v = \sqrt{(vx^2 + vy^2)}$$

where $vx=[x(0)-x(-2)]/[t(1)-t(-2)]$ and $$vy=[y(0)-y(-2)]/[t(0)-t(-2)]$$

c) The angle of the current direction of motion must have changed by more than a preset threshold (again, this threshold is different from that for a roundhouse throw).

Thus, $|\Theta_2 - \Theta_1| > \text{threshold}$.

Here $\Theta_2 = \tan^{-1}[(y(0) - y(-2)/(x(0) - x(-2))]$ $\Theta_1 = \tan^{-1}[(y(-3) - y(-5))/(x(-3) - x(-5))]$ 3. Flick throw (for flicking an object off the hand with a quick wrist motion)
   Criteria for flick throw:
   a) At least 9 samples must have been acquired
   b) The current velocity of the hand must be less than a preset threshold
   Here $$\text{Here } v = \sqrt{(vx^2 + vy^2)}$$

where $vx=[x(0)-x(-2)]/[t(0)-t(-2)]$ and $vy=[y(0)-y(-2)]/[t(0)-t(-2)]$ c) The velocity of the hand must have recently exceeded a preset threshold.
where $vx_0=[x(-2)-x(-4)]$ and $vy_0=[y(-2)-y(-4)]/[t(-2)-t(-4)]$
The recent velocity here is $$v_0 = \sqrt{(vx_0^2 + vy_0^2)}$$

The system includes the ability to smooth information in order to eliminate noise. However, with too much smoothing, the response time of the system is noticeably sluggish, and with too little smoothing, there is noticeable shaking of the observed position of the hand due to system noise. In order to overcome these two limitations, an adaptive smoothing process is employed. The smoothed hand position sx, sy, is determined as follows:

$$v = \sqrt{(vx^2 + vy^2)}$$

where $vx-[x(0)-x(-2)]/[t(0)-t(-2)]$ and $vy=[y(0)-y(-2)]/[t(0)-t(-2)]$

Case 1: v is small (i.e. $v<v0$ for some threshold v0)—smooth a lot so that jitter will not be seen
$sx=[x(0)+2*x(-1)+x(-2)]/4$
$sy=[y(0)+2*y(-1)+y(-2)]/4$
Case 2: v is moderate (i.e. $v0<=v<vI$ for some threshold vI)—do moderate smoothing
$sx=[x(0)+x(-1)]/2$
$sy=[y(0)+y(-1)]/2$ Case 3: v is large (i.e. $v>=vI$)—do no smoothing so that response time is not slow
$sx=x(0)$
$sy=y(0)$ For some applications, it is useful to know the size of the participant. During the initial training stage, a table of all colors which appear in the background is constructed. See FIG. 6A, 404. Upon receipt of the "measure height" command, the tracking system scans the player and searches the image for the closest grouping of non-background pixels to the top and to the bottom of the player's image. These pixel groupings are determined to be the top and bottom of the participant, respectively. From the position of the top and bottom of the participant in the image, a good estimate of the participant's height can be obtained. With this information, it is possible to automatically scale the height of the player or participant 14 with respect to his virtual opponent 20 so that they are more equal in height and, therefore, more lifelike.

Similarly, in a number of applications, it is useful to know the approximate location of the player's body. Since determining the exact location of the edges of the body is a very time-consuming task, the screen is scanned until non-background pixels are found at least two separate rows. The average of the bounds on these rows is taken to be a set of rough horizontal bounds on the position of the participant. If one knows the width of the participant, it is possible to use that information so that the participant can, for example, "bounce off the walls" or otherwise interact with other objects. Also, for many applications, it is useful to know when the participant's body has touched a certain area on the screen. With outline tracking, a number of rectangles on the screen are specified. The borders of these rectangles are continuously checked for non-background pixels. The presence of non-background pixels indicates that the person has crossed the boundary of that rectangle. This is useful to simulate the situation where a person touches something on the screen. Alternatively, the item in the box could move so as to simulate someone throwing a brick or other object.

While the invention has been described with reference to the preferred embodiment, it will be appreciated by those of ordinary skill in the art that various modifications can be made to the structure and function of the invention without departing from the spirit and scope thereof.

I claim:

1. A virtual reality game method for use by at least one human player who wears at least one identifiable object having a unique color, said game comprising the steps of:
   (a) scanning a background and creating a first color table of background colors;
   (b) scanning said identifiable object;
   (c) creating a second color table with colors distinctive only to said identifiable object by deleting all colors that said identifiable object has in common with said background;
   (d) repeatedly scanning said player wearing said identifiable object against said background and creating frames of pixels in a frame buffer representative of said colors in said scan;
   (e) identifying said colors in said frames that are unique to said identifiable objects;

(f) predicting an area, less than a full frame, where said identifiable object will be located in subsequent frames;

(g) scanning said predicted area to locate said identifiable object; and, (h) using said identifiable object to manipulate a virtual object toward a virtual goal.

2. The method of claim 1 further comprising the step of:

(i) locating the centroid of said identifiable object in order to establish specific x and y coordinates for said identifiable object.

3. The method of claim 2 further comprising the steps of:

(j) attaching said virtual object to said identifiable object in a display;

(k) detecting the movement of said identifiable object to distinguish between at least two different gestures involving said identifiable object; and, (l) propelling said virtual object toward said goal in response to the recognition of one of said at least two gestures made by said identifiable object.

4. The method of claim 3 wherein said identifiable object comprises a glove and said virtual object comprises a ball and wherein said method further comprises the step of:

(m) determining the direction and velocity of said gesture detected in step (k) and crediting the player with a score if said direction and velocity are substantially in the direction of said goal.

5. The method of claim 4 further comprising the steps of:

(n) determining the height of said player by detecting when a scan of said player against said background first comes into contact with a non-background object; and, (o) automatically scaling the height of a virtual opponent in proportion to the height of said player.

6. The method of claim 5 further comprising the step of:

(p) performing a coarse-to-fine search by searching only a limited number of lines of said predicted area from step (g) first, and then increasing the number of lines searched until said glove is located.

7. The method of claim 6 further comprising the step of:

(q) increasing the size of said predicted search area to a larger search area if said glove is not located.

8. The method of claim 7 further comprising the step of:

(r) searching the entire frame stored in said frame buffer, beginning with the center thereof, if said glove is not located in said predicted search area determined by step (g) or in said larger search area as determined in step (q).

9. The method of claim 8 further comprising the step of:

(s) increasing the population of identifiable object color specific pixels by merging a first table of possible colors with a second master table of glove colors and then increasing the merged table of glove colors by filling in the voids surrounded by glove colors and by allowing neighboring colors on the edges of said glove colors in the merged table to take on glove specific color values.

10. The method of claim. 9 further comprising the step of:

(t) organizing pixels in said color tables by chroma X, chroma Y and luma, wherein each pixel is formatted initially by two bits of chroma X, followed by two bits of chroma Y, and followed by six bits of luma, wherein said color values in said color tables are first compared using said above information as a means of rapid comparison of said values.

11. The method of claim 10 further comprising the step of:

(u) determining the width of said player so that said player's location can interact with a background.

12. The method of claim 10 further comprising the step of:

(v) determining the outline of said player so that said player can interact with a background.

13. The method of claim 3 wherein said game includes two players each wearing different identifiable object gloves, and wherein said two players play against each other to put said virtual object in said virtual goal.

14. The method of claim 3 wherein predetermined gestures made by said identifiable object cause the image of said player to move with respect to said display, wherein the movement of said player causes the player to appear as though the player was in an environment having gravity substantially smaller than that of the earth.

15. A virtual reality game apparatus for use by at least one player having on his person an identifiable object having a distinctive color, said apparatus comprising:

scanning means for scanning said player and for storing said information in a frame buffer;

color identifying means for determining which of said colors of said identifiable object is most accurately identifiable and, for locating said identifiable object from the information in said frame buffer based upon its distinctive color when said player is wearing said identifiable object; and, display means for displaying said player and said identifiable object having said most accurately identifiable color in a virtual reality setting, wherein said player is correctly positioned within said virtual reality setting based upon the location of said identifiable object with said most accurately identifiable color.

* * * * *